US012065051B2

(12) United States Patent
Hetrich

(10) Patent No.: US 12,065,051 B2
(45) Date of Patent: Aug. 20, 2024

(54) SYSTEMS AND METHODS FOR ELECTRIC VEHICLE CHARGING USING MACHINE LEARNING

(71) Applicant: ABB E-mobility B.V., Delft (NL)

(72) Inventor: Matthew Hetrich, Raleigh, NC (US)

(73) Assignee: ABB E-mobility B.V., Delft (NL)

( * ) Notice: Subject to any disclaimer, the term of this patent is extended or adjusted under 35 U.S.C. 154(b) by 691 days.

(21) Appl. No.: 17/308,184

(22) Filed: May 5, 2021

(65) Prior Publication Data

US 2022/0355692 A1 Nov. 10, 2022

(51) Int. Cl.
*H01M 10/44* (2006.01)
*B60L 53/10* (2019.01)
*B60L 53/16* (2019.01)
*B60L 53/37* (2019.01)
*G06N 20/00* (2019.01)
*H01M 10/46* (2006.01)

(52) U.S. Cl.
CPC .............. *B60L 53/37* (2019.02); *B60L 53/11* (2019.02); *B60L 53/16* (2019.02); *G06N 20/00* (2019.01)

(58) Field of Classification Search
CPC ......... H02J 50/005; B60L 53/11; B60L 53/37; B60L 53/16; B60L 53/14; B60L 2260/46; G06N 20/00; G06N 3/045; G06N 3/08; Y02T 90/12; Y02T 10/70
USPC ................................................. 320/104, 109
See application file for complete search history.

(56) References Cited

U.S. PATENT DOCUMENTS

| | | | | |
|---|---|---|---|---|
| 2012/0105668 A1* | 5/2012 | Velarde | ................. | H04N 23/71 348/229.1 |
| 2014/0203629 A1* | 7/2014 | Hoffman | ................. | B60L 53/37 307/104 |
| 2019/0266747 A1* | 8/2019 | Zhou | ........................ | G06T 7/73 |
| 2021/0023707 A1* | 1/2021 | Ma | ........................ | B25J 9/1605 |
| 2022/0001761 A1* | 1/2022 | Cole | ....................... | G06V 20/00 |
| 2023/0191934 A1* | 6/2023 | Lee | ....................... | G05D 1/0246 320/109 |

FOREIGN PATENT DOCUMENTS

WO WO-2019139463 A2 * 7/2019 ............ B25J 11/008

* cited by examiner

*Primary Examiner* — Edward Tso
(74) *Attorney, Agent, or Firm* — Leydig, Voit & Mayer, Ltd.

(57) ABSTRACT

A plug connection system that autonomously charges an electric vehicle (EV) is provided. The method includes: obtaining a trained machine learning (ML) model from a back-end server; capturing an image using an image capturing device of the charging system, wherein a portion of the image comprises the EV charging portal; inputting the image into the trained ML model to determine one or more regions of interest associated with the EV charging portal within the image; determining a location of the EV charging portal based on the one or more determined regions of interest and one or more image processing techniques; and providing information to maneuver the robotic arm of the charging system to a physical position based on the determined location of the EV charging portal.

20 Claims, 9 Drawing Sheets

800

SYSTEMS AND METHODS FOR ELECTRIC VEHICLE CHARGING USING MACHINE LEARNING

FIELD

The present disclosure relates to an automatic electric vehicle-charging system.

BACKGROUND

Automatic charging of electric vehicles (EVs) is perceived in the EV industry as an important business opportunity because it enables a high degree of safety during charging, which, in turn, enables use of high charging power ratings (fast-charging), improves operational efficiency in charging fleet vehicles or vehicles at a public charge station, and increases customer comfort. Autonomous charging is made possible using mobile robots or robotic arms capable of interacting with the EV charging equipment and EVs.

A key technical challenge for an EV charging system is identifying a physical position of an EV charging portal (e.g., EV inlet) on the EV and creating an accurate registration in order to enable automatic charging of the EV. Traditionally, EV charging systems have attempted to remedy this problem by using image processing. However, traditional approaches suffer from major drawbacks as they require a large amount of computational bandwidth to process the entire image to determine the location of the EV charging portal. Accordingly, there remains a technical need for computationally efficient system for identifying the position of the EV inlet to enable automatic charging.

SUMMARY

A first aspect of the present disclosure provides a method for a charging system to autonomously charge an electric vehicle (EV). The method comprises: obtaining, by a control system, a trained machine learning (ML) model from a back-end server; capturing, by the control system, an image using an image capturing device of the charging system, wherein a portion of the image comprises an EV charging portal of the EV; inputting, by the control system, the image into the trained ML model to determine one or more regions of interest associated with the EV charging portal within the image; determining, by the control system, a location of the EV charging portal based on the one or more determined regions of interest and one or more image processing techniques; and providing, by the control system, information to maneuver a robotic arm of the charging system to a physical position based on the determined location of the EV charging portal.

According to an implementation of the first aspect, inputting the image into the trained ML dataset to determine the one or more regions of interest comprises inputting the image into the trained ML dataset to generate one or more dimension dependent parameters associated with one or more bounding boxes within the image. Further, determining the location of the EV charging portal is based on: filtering out pixels within the image that are outside of the one or more bounding boxes; and applying the one or more image processing techniques to remaining pixels within the one or more bounding boxes.

According to an implementation of the first aspect, the one or more dimension dependent parameters indicate an area of a first bounding box of the one or more bounding boxes, one or more dimensions of the first bounding box, or one or more corner points of the first bounding box.

According to an implementation of the first aspect, inputting the image into the trained ML model to determine the one or more regions of interest comprises inputting the image into the trained ML model to generate a pixel value dependent parameter associated with a pixel characteristic and determining the location of the EV charging portal is based on: filtering out pixels within the image based on the pixel value dependent parameter; and applying the one or more image processing techniques to the image based on filtering out the pixels.

According to an implementation of the first aspect, the pixel characteristic is a value associated with a pixel within the image, and wherein the pixel value dependent parameter is a datatype threshold that is used to filter out the pixels within the image.

According to an implementation of the first aspect, the robotic arm is controllably extendable and retractable, wherein the robotic arm is adapted to carry a charging plug located at a distal end of the robotic arm, the charging plug is configured to be controllably moveable and insertable into the charging portal of the EV.

According to an implementation of the first aspect, capturing the image using the image capturing device comprises: providing instructions for a light emitter to emit illumination at a certain light spectrum; capturing the image using the illumination at the certain light spectrum; and using a band-pass filter to filter out portions of the image based on the illumination at the certain light spectrum, wherein inputting the image into the trained ML model comprises inputting the image that has been filtered using the band-pass filter into the trained ML model.

According to an implementation of the first aspect, the trained ML dataset is a convolutional neural network (CNN), and wherein the back-end server trains the CNN using actual images of one or more first EV charging portals and/or synthetic data of one or more second EV charging portals.

According to an implementation of the first aspect, determining the location of the EV charging portal comprises: determining a plurality of keypoints within the determined regions of interest based on a known geometry associated with the EV charging portal; generating a virtual skeleton image of the EV charging portal based on the plurality of keypoints; and determining the location of the EV charging portal based on applying the one or more image processing techniques to the plurality of keypoints and the virtual skeleton image.

According to an implementation of the first aspect, the one or more image processing techniques comprises a scale-invariant feature transform (SIFT) technique or an oriented FAST and rotated BRIEF (ORB) technique.

According to an implementation of the first aspect, determining the location of the EV charging portal comprises: determining a six degrees of freedom (DoF) associated with the EV charging portal based on the one or more determined regions of interest and one or more image processing techniques; and determining the location of the EV charging portal based on the six DoF.

According to an implementation of the first aspect, inputting the image into the trained ML dataset to determine the one or more regions of interest comprises inputting the image into the trained ML dataset to generate one or more dimension dependent parameters associated with one or more segmentation masks within the image and determining the location of the EV charging portal is based on: filtering out pixels within the image that are outside of the one or more segmentation masks; and applying the one or more image processing techniques to remaining pixels within the one or more segmentation masks.

According to an implementation of the first aspect, the one or more dimension dependent parameters indicate an area of a first segmentation mask of the one or more segmentation masks, one or more dimensions of the first segmentation mask, or one or more corner points of the first segmentation mask.

According to an implementation of the first aspect, inputting the image into the trained ML dataset to determine the one or more regions of interest comprises inputting the image into the trained ML dataset to generate one or more dimension dependent parameters associated with one or more point clouds within the image and determining the location of the EV charging portal is based on: filtering out pixels within the image that are outside of the one or more point clouds; and applying the one or more image processing techniques to remaining pixels within the one or more point clouds.

According to an implementation of the first aspect, the one or more dimension dependent parameters indicate an area of a first point cloud of the one or more point clouds, one or more dimensions of the first point cloud, or one or more corner points of the first point cloud.

A second aspect of the present disclosure provides a plug connection system for use in autonomously charging an electric vehicle (EV), the plug connection system. The plug connection system comprises a robotic arm that is controllably extendable and retractable, wherein the robotic arm is adapted to carry a charging plug located at a distal end of the robotic arm, wherein the charging plug is configured to be controllably moveable and insertable into a charging portal of the EV. The plug connection system further comprises an image capturing device configured to capture one or more images and a control system. The control system is configured to: obtain a trained machine learning (ML) model from a back-end server; capture an image using the image capturing device, wherein a portion of the image comprises the EV charging portal; input the image into the trained ML model to determine one or more regions of interest associated with the EV charging portal within the image; determine a location of the EV charging portal based on the one or more determined regions of interest and one or more image processing techniques; and provide information to maneuver the robotic arm to a physical position based on the determined location of the EV charging portal.

According to an implementation of the second aspect, inputting the image into the trained ML dataset to generate one or more dimension dependent parameters associated with one or more bounding boxes within the image and determining the location of the EV charging portal is based on: filtering out pixels within the image that are outside of the one or more bounding boxes; and applying the one or more image processing techniques to remaining pixels within the one or more bounding boxes.

According to an implementation of the second aspect, the one or more dimension dependent parameters indicate an area of a first bounding box of the one or more bounding boxes, one or more dimensions of the first bounding box, or one or more corner points of the first bounding box.

According to an implementation of the second aspect, inputting the image into the trained ML model to determine the one or more regions of interest comprises inputting the image into the trained ML model to generate a pixel value dependent parameter associated with a pixel characteristic, and determining the location of the EV charging portal is based on: filtering out pixels within the image based on the pixel value dependent parameter; and applying the one or more image processing techniques to the image based on filtering out the pixels.

A third aspect of the present disclosure provides a non-transitory computer-readable medium having processor-executable instructions stored thereon. The processor-executable instructions, when executed by one or more controllers, facilitate: obtaining a trained machine learning (ML) model from a back-end server; capturing an image using an image capturing device of a charging system, wherein a portion of the image comprises the EV charging portal; inputting the image into the trained ML model to determine one or more regions of interest associated with the EV charging portal within the image; determining a location of the EV charging portal based on the one or more determined regions of interest and one or more image processing techniques; and providing information to maneuver a robotic arm of the charging system to a physical position based on the determined location of the EV charging portal.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
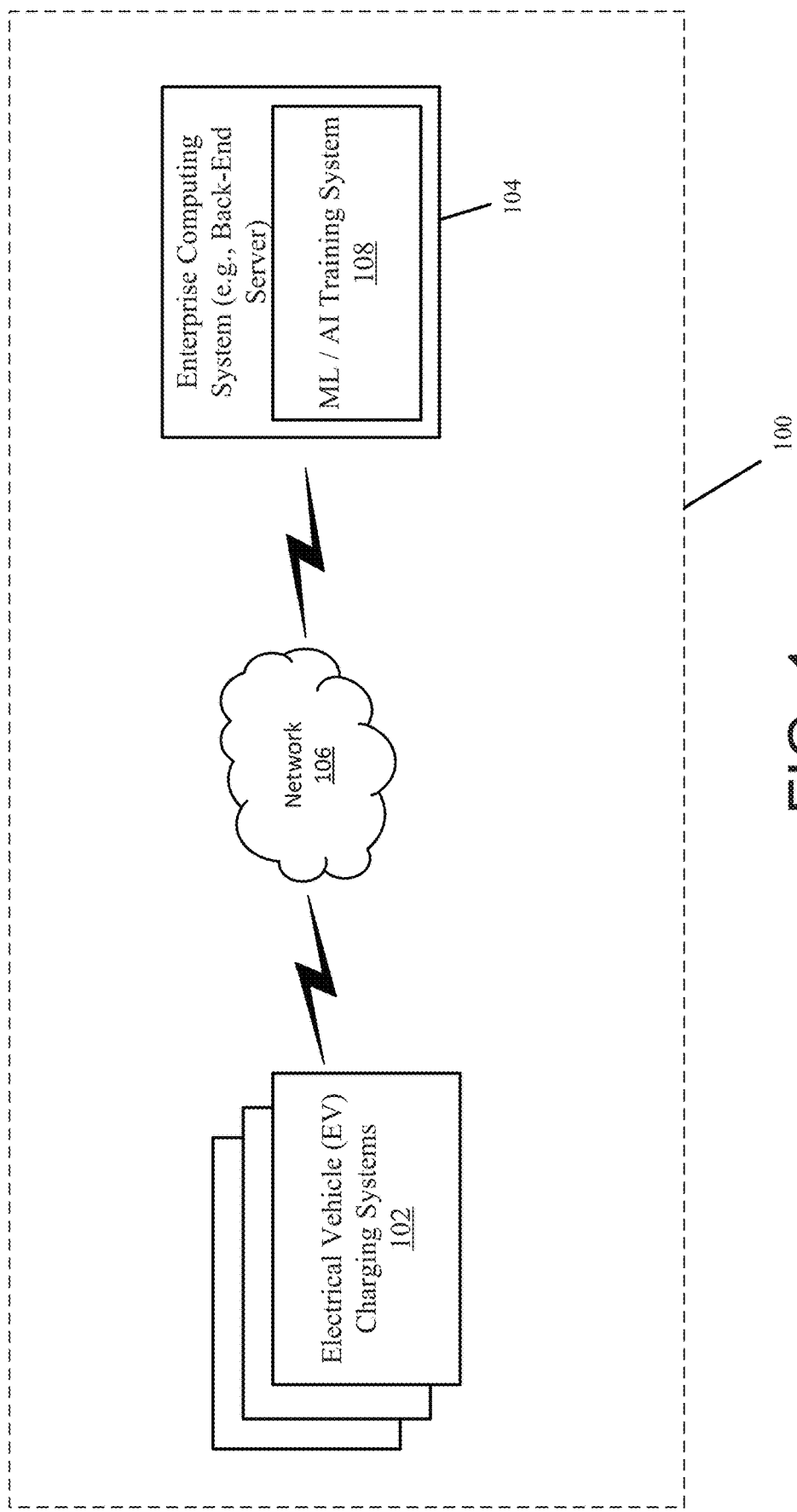
FIG. 1 illustrates a simplified block diagram depicting an environment for using machine learning to process an image of an electrical vehicle (EV) charging portal according to one or more examples of the present disclosure.

The present disclosure describes an automatic electric vehicle (EV) charging system and environment, which provides advantages over the state of the art. In particular, the present disclosure relates to the field of autonomous localization and autonomous electric vehicle charging. For example, the present disclosure enables a hands-free, autonomous electrical connection of an electric charger to an EV. This connection may be able to automatically determine the precise location of the charging receptacle on the EV and may be optimized for minimal processing overhead to function on an embedded platform, to be cost effective, and to maximize invariance (e.g., the system reading may remain unchanged regardless of scale, rotation, lighting, noise, and so on). In some instances, the present disclosure uses a machine learning architecture or algorithm such as a convolutional neural network (CNN) to reduce the computing overhead while simultaneously increasing invariance of the overall system (e.g., the EV charging system).

In some examples, the present disclosure describes a six degrees of freedom (DoF) invariant pose estimation that leverages a CNN. For instance, the output of the CNN may be used for scaling input parameters for one or more image processing methods/algorithms. This may be leveraged for maximizing image scale invariance based on geometry of the output of the CNN. Additionally, and/or alternatively, the output of the CNN may be leveraged to filter out irrelevant pixels and/or adjust the pixel data distribution based on one or more properties of the regions of interest. Furthermore, the present disclosure may significantly reduce the compute overhead by intelligently determining keypoints within the arbitrary object using one or more image processing techniques (e.g., accelerated image processing techniques).

In some variations, a system (e.g., an EV charging system and/or a back-end processor) may determine the location of the EV charging portal and initiate charging of the EV using a CNN that is trained on data collected/generated and augmented. Further, the system may determine dimension(s) of a bounding box/mask or other output from the CNN and use the dimensions to scale/modify image processing techniques. For instance, the system may determine a dimension dependent parameter, a pixel/pixel region value dependent parameter, and/or additional/alternative parameters that may be used to initiate charging of the EV. The dimension dependent parameter, such as an area of the CNN bounding box, may scale the value of the contour sizes that are filtered out, which may allow the contour filtering to maintain the contours of interest as well as invariant of scale/rotations. The pixel/pixel region value dependent parameter, such as a multi-modal distribution of pixel values within the bounding box, may be used to improve and/or maximize contrast by applying a threshold/filter between modes. This may make the process invariant to noise/contamination or otherwise irrelevant pixel information outside of the bounding box region of interest. Further, the system may filter contours/objects of interest so as to fit an expected geometry such that the process is invariant to edge noise/shadows. The system may determine reliable "keypoints" (e.g., points of interest within the image), which may be created based on the geometry from the filtered contours/objects. From the reliable keypoints, the system may determine an accurate, high contrast virtual skeleton. Additionally, the system may match the determined keypoints to features of a template by a feature matching algorithm and based on a match quality score. The system may use the matched keypoints to solve the perspective problem to transform the observed keypoints to the template keypoints, which may result in an invariant six DoF pose estimation. This will be explained in further detail below.

In particular, exemplary aspects of the charging systems, charging devices, and/or back-end servers according to the present disclosure, are further elucidated below in connection with exemplary embodiments, as depicted in the figures. The exemplary embodiments illustrate some implementations of the present disclosure and are not intended to limit the scope of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

FIG. 1 illustrates a simplified block diagram depicting an environment 100 for using machine learning to process an image of an electrical vehicle (EV) charging portal according to one or more examples of the present disclosure.

Referring to FIG. 1, the environment 100 includes one or more EV charging systems 102, an enterprise computing system 104 (e.g., a back-end server), and a network 106. Although the entities within environment 100 may be described below and/or depicted in the FIGs. as being singular entities, it will be appreciated that the entities and functionalities discussed herein may be implemented by and/or include one or more entities.

The entities within the environment 100 such as the EV charging systems 102 and the enterprise computing system 104 may be in communication with other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. Additionally, and/or alternatively, the EV charging systems 102 and the enterprise computing system 104 may be in communication with each other without using the network 106. For instance, the EV charging systems 102 may use one or more communication protocols such as WI-FI or BLUETOOTH to communicate with directly with the enterprise computing system 104.

The enterprise computing system 104 is a computing system that is associated with the enterprise organization. In some instances, the enterprise computing system 104 is a back-end server for the enterprise organization. The enterprise organization may be any type of corporation, company, organization, institution, or the like that is formed to pursue entrepreneurial endeavors such as by selling goods and/or by providing services.

Figure 6:
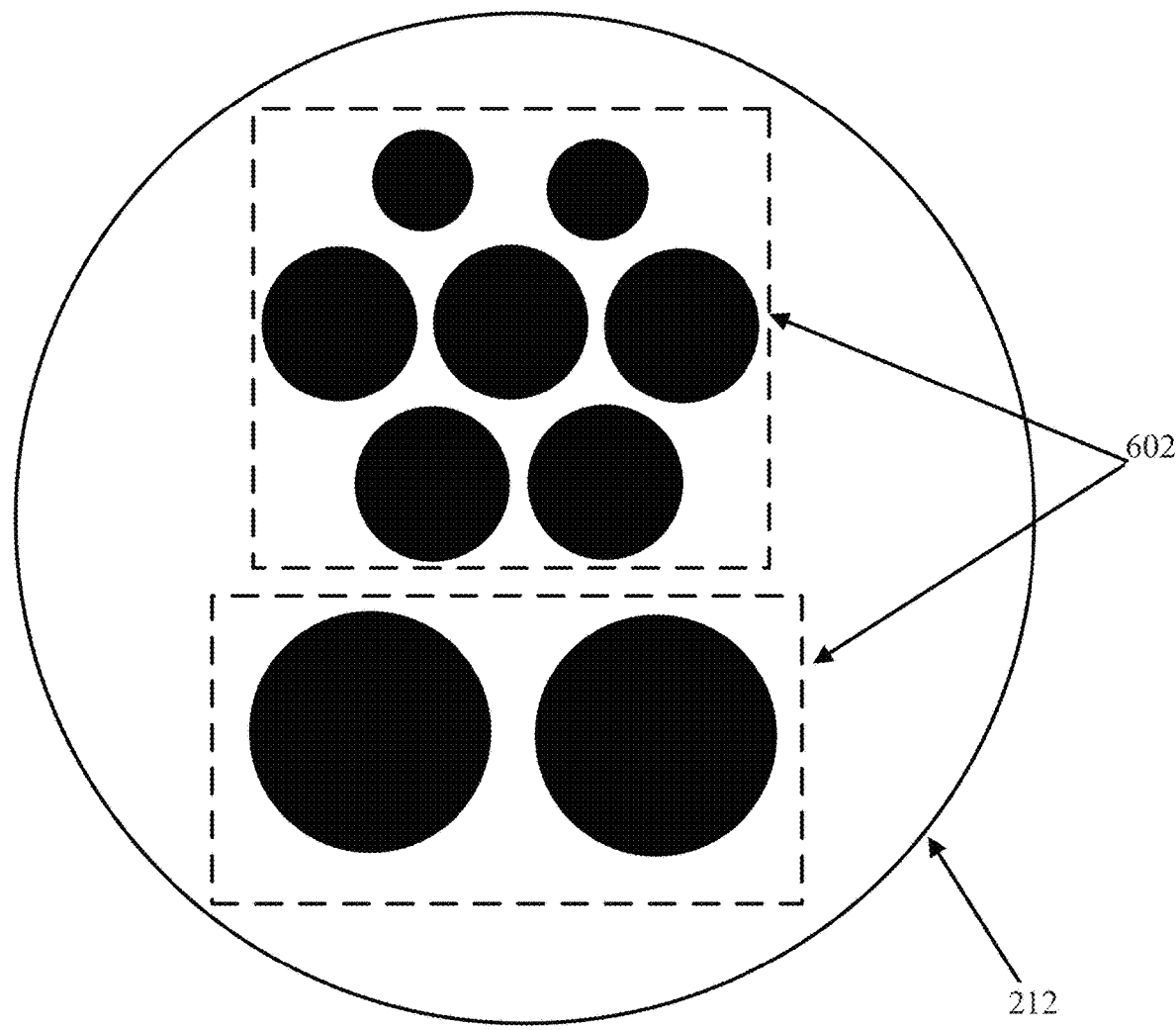
FIG. 6 depicts an exemplary configuration of an EV charging portal according to one or more examples the present disclosure.

The enterprise computing system 104 includes one or more computing devices, computing platforms, systems, servers, and/or other apparatuses capable of performing tasks, functions, and/or other actions for the enterprise organization. For example, as shown, the enterprise computing system 104 includes a ML/AI training system 108. The training system 108 trains ML and/or AI models, datasets, and/or algorithms (e.g., neural networks (NN)

and/or convolutional neural networks (CNNs)) that may be used to charge an EV. For example, the training system 108 may obtain a generic object detection ML model (e.g., a generic CNN) and train this model or dataset for determining regions of interest within captured images. The regions of interest may be associated with an EV charging portal. For example, an EV charging portal such a Combined Charging System Type 1 or 2 (CCS 1 or CCS 2) charging portal may have a particular geometry (e.g., as shown in FIG. 6, which will be described in further detail below). The training system 108 may obtain images of a particular type of EV charging portal and train a CNN using the obtained images of the EV charging portal. For instance, the training system 108 may train the CNN such that the CNN outputs regions of interest (e.g., bounding boxes) within the image. As will be explained in further detail below, the regions of interest may be used by the EV charging systems 102 to determine a location of the EV charging portal. After training the ML/AI model or dataset, the enterprise computing system 104 provides the trained ML/AI model or dataset to the one or more EV charging systems 102.

The training system 108 may train any type of ML models that may localize an object within an image. Examples of ML models include, but not limited to, supervised ML/AI models, unsupervised ML/AI models, and/or deep learning ML/AI models. In some instances, the ML models are NN or CNN. In some examples, the ML model is a You Only Look Once (YOLO) ML architecture such as a YOLO v5 architecture.

In some instances, the training system 108 may train the ML models such as a CNN using actual images (e.g., actual, real-world images) of EV charging portals, including but not limited to data collected during operation. In other instances, the training system 108 may generate and/or obtain synthetic data of EV charging portals and train the ML models using the synthetic data. For instance, the training system 108 may generate models of EV charging portals using Computer-Aided Design (CAD), simulation, ray-tracing, or game development engine software. The training system 108 may generate different angles and poses of the EV charging portal in order to create a model and use the model to train the CNN. In yet other instances, the training system 108 may use both actual images and synthetic data to train the ML models.

In some examples, the training system 108 trains one or more ML models for each type of EV charging portal. For instance, the training system 108 may train a first ML model (e.g., a first CNN) for the CCS 1 EV charging portal and may train a second ML model (e.g., a second CNN) for the CCS 2 EV charging portal. The enterprise computing system 104 may provide a particular ML model to the EV charging systems 102 based on the type of charging portal that is serviced at the EV charging systems 102. For instance, a first EV charging system may have a charging plug that services CCS 1 EV charging portals. Accordingly, the enterprise computing system 104 may provide the first CNN to the first EV charging system. A second EV charging system may have a charging plug that services CCS 2 EV charging portals. Accordingly, the enterprise computing system 104 may provide the second CNN to the second EV charging system.

In some variations, the enterprise computing system 104 may be implemented using one or more computing platforms, devices, servers, and/or apparatuses. In other variations, the enterprise computing system 104 may be implemented as engines, software functions, and/or applications. In other words, the functionalities of the enterprise computing system 104 may be implemented as software instructions stored in storage (e.g., memory) and executed by one or more processors.

Figure 2:
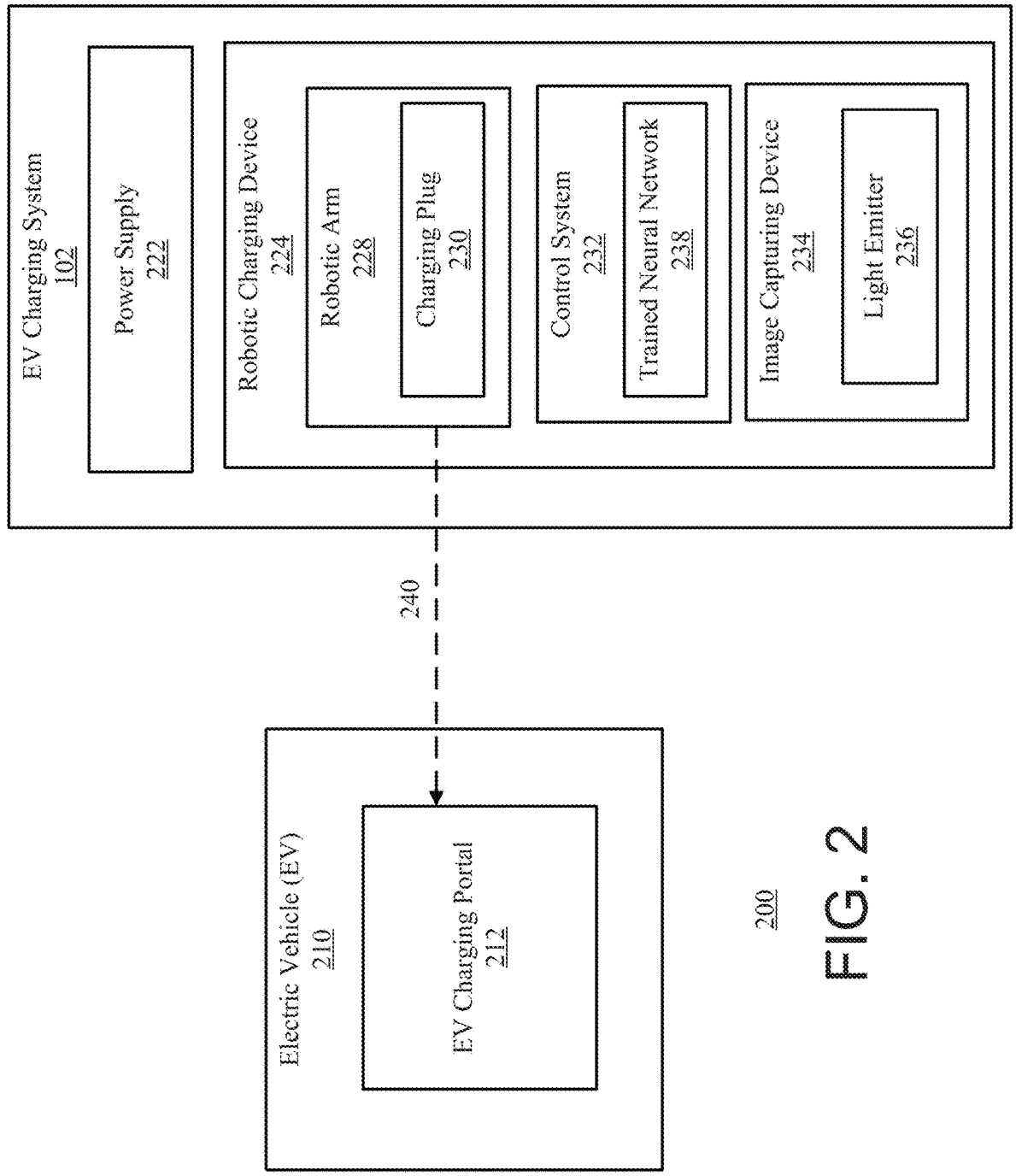
FIG. 2 illustrates a simplified block diagram depicting EV charging environment according to one or more examples of the present disclosure.

The EV charging systems 102 include one or more charging systems that are configured to charge an EV. For example, the EV charging systems 102 may include an image capturing device (e.g., a camera) that is configured to capture images of the EV charging portal of the EV. The EV charging systems 102 may further obtain a trained ML model (e.g., trained CNN) from the enterprise computing system 104 and input the captured images into the trained ML model to determine one or more regions of interest. The EV charging systems 102 may further use one or more image processing algorithms or techniques (e.g., scale-invariant feature transform (SIFT) technique) on the determined regions of interest to determine a location of the EV charging portal of the EV. Then, the EV charging system 102 may move a charging plug to the determined location to charge the EV. FIG. 2 will describe an exemplary EV charging system 102 in further detail.

It will be appreciated that the exemplary environment depicted in FIG. 1 is merely an example, and that the principles discussed herein may also be applicable to other environments.

FIG. 2 illustrates a simplified block diagram depicting EV charging environment 200 according to one or more examples of the present disclosure.

Referring to FIG. 2, the EV charging environment 200 includes an electric vehicle (EV) 210 and an electric vehicle (EV) charging system 102. Among other components, systems, and/or entities such as an engine and/or transmission, which are not shown, the EV 210 includes an EV charging portal 212 such as an EV inlet.

The EV charging system 102 (e.g., plug/charging plug connection system) includes an automated-robotic charging device 224 and a power supply 222. The robotic charging device 224 includes a robotic arm 228, a control system 232, an image capturing device 234, and a light emitter 236. The robotic arm 228 is adapted to engage and carry a charging plug 230. In some instances, the charging plug 230 may be integrated with the robotic arm 228, while in other instances, the robotic arm 228 may be separate from, but engagable to carry, the charging plug 230. The image capturing device 234 is configured to capture images of the EV charging portal 212. The light emitter 236 is configured to emit light onto the EV charging portal 212 when the image capturing device 234 captures an image of the EV charging portal 212. In some instances, the image capturing device 234 may be located on the robotic arm 228 such as at an end of the robotic arm 228.

The power supply 222 may be an EV charging unit (EVCU), which supplies high voltage for charging. The power supply 222 may be usable with or without the robotic charging device 224. The EV charging system 102 is configured to automatically and/or conveniently charge the EV 210, without human intervention or interaction, thus, providing a safe and convenient charging experience for the user or operator of the EV 210.

The power supply 222 receives AC power (e.g., from a utility power supply), and converts and conditions the main supply to a power suitable for charging an EV 210 (e.g., a DC voltage with a sufficient current rating for rapid charging of EVs). The power supply 222 is electrically coupled to the robotic charging device 224 to provide charging power to the charging device 224. The robotic charging device 224 may then supply the charging power to the EV 210, in an automated and operator-free manner. A control system 232 of the charging device 224 may communicate with the power supply 222 (e.g., to provide loose or tight control of the charging).

The EV charging system 102 and in particular, the control system 232 may detect when an EV 210 is within a predetermined proximity to the robotic charging device 224 and determine a physical position of the EV charging portal 212 on the EV 210. Based on the control system 232 determining the EV 210 and its EV charging portal 212 are within reach of the robotic charging device 224, the control system 232 uses the images captured by the image capturing device 234 to maneuver (e.g., guide, orient, move, displace, and/or actuate) the robotic arm 228 and position its charging plug 230 to be in close proximity to the charging portal 212. In some examples, the charging plug 230, the image capturing device 234, and/or the light emitter 236 may be integrated or otherwise operably included in the end effector of the robotic arm 228. In other examples, the image capturing device 234 and/or the light emitter 236 may be disposed at another location on or around the EV charging system 102, for example, at its base. The robotic charging device 224 then configures the charging plug 230 to be inserted into the EV charging portal 212, and charges the EV 210. The dotted line 240 represents the extension of the robotic arm 228 to the EV charging portal 212 of the EV 210. Once the charging is completed (or is otherwise stopped), the robotic charging device 224 removes the charging plug 230 from the EV charging portal 212, and retracts the robotic arm 228.

In some instances, the control system 232 maneuvers the robotic arm 228 by changing the physical position and/or orientation of the charging plug 230 of the robotic arm 228 such that it becomes aligned for insertion into the EV charging portal 212 of the EV 210. For instance, the control system 232 may first move the robotic arm 228 to be within a close proximity of the EV charging portal 212 and may then orient the charging plug 230 such that it becomes aligned for insertion into the EV charging portal 212. In other instances, the control system 232 may dynamically move the robotic arm 228 and orient the charging plug 230 in any order (including contemporaneously), providing for a smooth movement and insertion of the charging plug into the charging portal 212.

The control system 232 uses one or more images, or a continuous succession or series of images and/or videos, captured using an image capturing device 234 to maneuver the robotic arm 228 such that it becomes aligned with the EV charging portal 212. For example, the control system 232 captures an image that includes the EV charging portal 212. The control system 232 uses a trained neural network 238 to determine regions of interest and/or points of interest (e.g., keypoints) within the image. The control system 232 uses the determined regions of interest/keypoints to determine a location of the EV charging portal 212. The control system 232 uses the location of the EV charging portal 212 to maneuver the robotic arm 228 and/or the charging plug 230 towards the EV charging portal 212. This will be described in further detail below.

It will be appreciated that the exemplary environment depicted in FIG. 2 is merely an example, and that the principles discussed herein may also be applicable to other situations—for example, other types of EV charging systems 102.

Figure 3A:
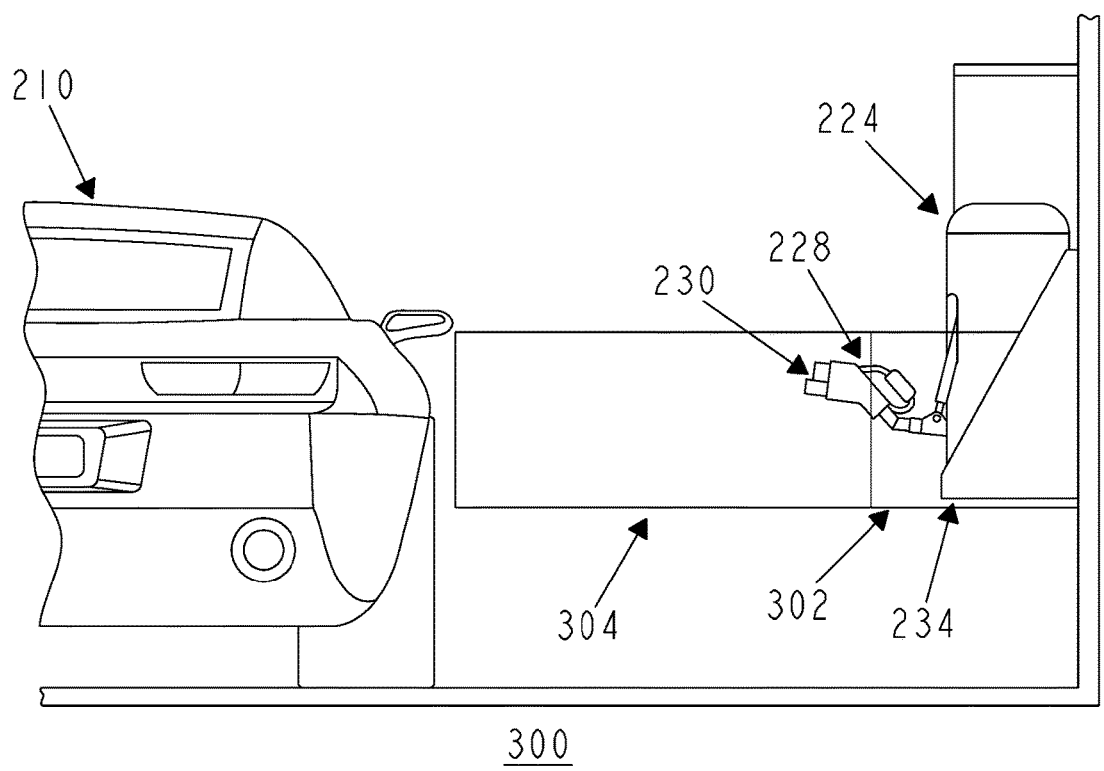
FIG. 3A illustrates an exemplary EV charging environment with an EV charging system in a collapsed, docked state according to one or more examples of the present disclosure.
Figure 3B:
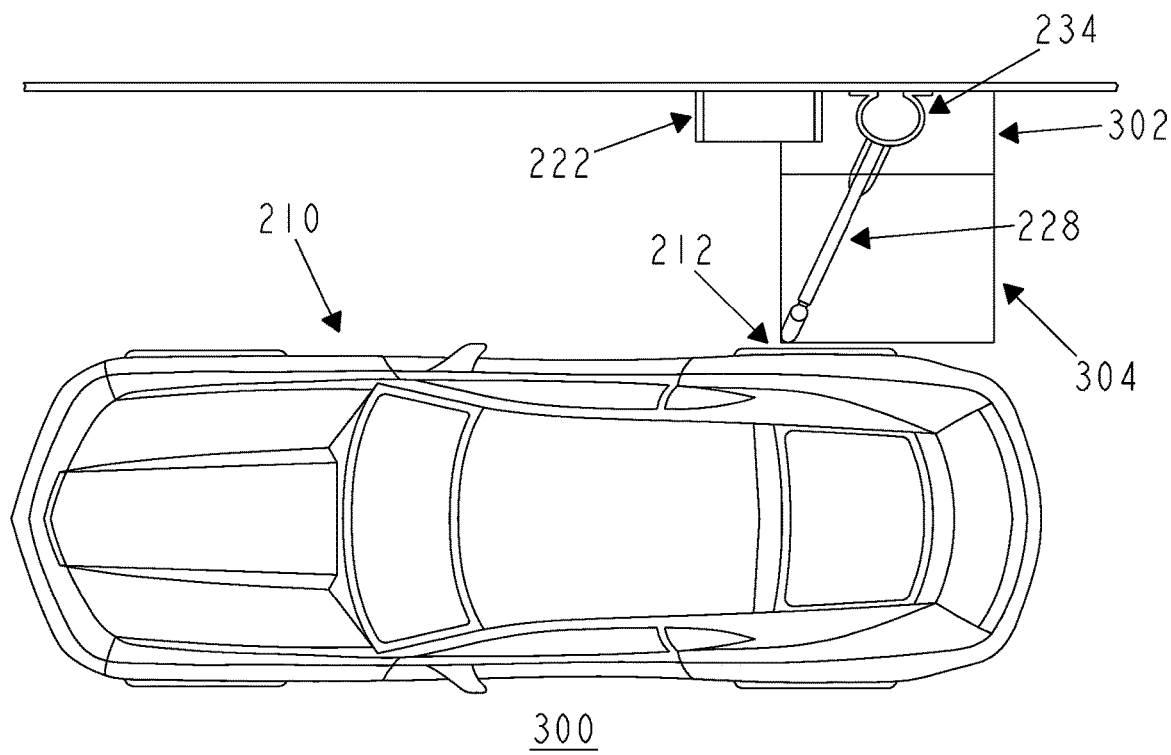
FIG. 3B illustrates the exemplary EV charging environment of FIG. 3A with the EV charging system in a charging state.

FIG. 3A illustrates an exemplary electric vehicle (EV) charging environment 300 with an EV charging system (e.g., EV charging system 102) in a collapsed, docked state according to one or more examples of the present disclosure and FIG. 3B illustrates the exemplary electric vehicle (EV) charging environment 300 of FIG. 3A with the EV charging system in a charging state. However, it will be appreciated that the EV charging environment 300 with the EV charging systems shown in FIGS. 3A and 3B are merely examples of the EV charging environment 200 from FIG. 2 and additional/alternative embodiments of EV charging environments, systems, and/or devices are contemplated within the scope of the present disclosure. For instance, in additional and/or alternative embodiments, the EV charging environment 300 may include a different robotic arm 228 assembly such as a scissor link mechanism for the robotic arm 228, or a different charging arrangement for the EV such as an EV having its charging plug on the undercarriage of the EV.

Referring to FIGS. 3A and 3B, the EV charging environment 300 includes the robotic charging device 224 and the power supply 222. The robotic charging device 224 includes the robotic arm 228 with a charging plug 230. The EV charging environment 300 further includes the EV 210. The EV 210 includes an EV charging portal 212.

Furthermore the EV charging environment 300 includes an image capturing device 234. For instance, the image capturing device 234 may be mounted, physically positioned, operatively coupled to, and/or fastened to a base of the robotic charging device 224. Additionally, and/or alternatively, another image capturing device may be mounted, physically positioned, operatively coupled to, and/or fastened to the robotic arm 228 and in particular, either on or adjacent the charging plug 230, which are both carried by an end-effector of the robotic arm. The locations of the image capturing devices are merely exemplary and in other examples, the image capturing devices are positioned at other locations within the EV charging environment 300 as appropriate to have line-of-sight to the moving charging plug 230 and also the charging port of the EV 210. The image capturing device 234 may be used as visualization and/or localization sensors that form part of the control system 232 for automatically controlling the robotic charging device 224 to maneuver and orient the charging plug 230 into the EV charging portal 212 for charging the EV 210. Additionally, and/or alternatively, in other examples, the EV charging environment 300 includes additional image capturing devices.

The EV charging environment 300 further shows a working volume 304 and a non-working volume 302. The working volume 304 is a physical space in which the robotic charging device 224 may maneuver its robotic arm 228 and engage its charging plug 230 with the EV charging portal 212 of the EV 210 (i.e., a volume of functional access). A non-working volume 302 of the robotic charging device 224 is a physical space near the robotic charging device 224 where the charging device 224 is configured such that it will not attempt to charge an EV 210 that is within that space. The non-working volume 302 may include spaces where the robotic charging device 224 is incapable of effectively plugging in its charging plug 230 into the EV charging portal 212, whether because of a mechanical collision or inability to obtain a proper orientation, and/or a buffer space to provide a safe walking distance for human occupants. Accordingly, the robotic charging device 224 might not attempt to move or otherwise engage with the EV 210 when the EV 210 is within the non-working volume 302.

The working volume 304 is defined by the mechanical and kinematic abilities of the robotic charging device 224 and the arrangement of the EV charging system 220 in its installation space. The working volume 304 of the robotic charging device 224 is, therefore, defined (at least in part) by the range of motion it can impart on the robotic arm 228 and the reach of its charging plug 230. In other words, the physical space defined as the working volume 304 in FIGS. 3A and 3B includes locations to which the tip of the robotic arm 228 and, consequently, its end-effector, may reach and locations to which the charging plug 230 may be inserted. The robotic charging device 224 is capable of at least rotating (yaw), pitching, and/or extending/retracting its robotic arm 228. In other words, the kinematics of robotic charging device 224 includes rotational movement and linear movement.

In some instances, the robotic charging device 224 may further controllably orient and move the charging plug 230 independently of the arm 228. This provides an extended range of motion and orientation that enables the charging device 224 to accurately position the charging plug 230 for insertion into the charging portal 212.

In some examples, the robotic arm 228 and the charging plug 230 are separate components and/or devices. For instance, the EV charging system 102 might not include the charging plug 230. In other words, the robotic arm 228 may be configured to control, move, and/or maneuver an existing charging plug 230 within the environment 300 such that it is insertable into the charging portal 212. In some instances, the charging plug 230 is located at the distal end of the robotic arm 228. For instance, the charging plug 230 may be situated at the tip of the robotic arm 228. Additionally, and/or alternatively, the charging plug 230 may be located above and/or below the tip of the robotic arm 228. Additionally, and/or alternatively, the charging plug 230 may be located a certain distance (e.g., several inches) away from the tip of the robotic arm 228.

In some variations, the EV charging system 102 may also include a user feedback/user interface (UI) for communicating with an operator of the EV 210 or otherwise communicating with a user of the EV charging environment 300. For example, the EV charging system 102 may include a UI/perception display. The display may provide information to a user (e.g., localization or charging feedback). For instance, the display may inform the user in real time with respect to the position of the EV 210 and the charging status. With regard to the localization/position feedback, the display may give a signal for the operator on positioning/stopping the EV 210 (similar to what a user may experience at a drive-through car wash). For example, the display may alert the user to move forward, back, or angle right/left. With regard to the charging state, the display may alert the user to a charging status, e.g., charging, charged, percent charge, or remaining charge time. As should be apparent, other user feedback information is contemplated within the scope of this disclosure.

In some variations, the display may be mounted on the charging device 224. The display may, however, alternatively and/or additionally be provided external to the robotic charging device 224. For example, a display may be at a remote mount, which is positioned near the EV 210 (such as a control point for paying for (or interacting with) the EV charging system 102). A projector may also project a projected image conveying user feedback information. The robotic charging device 224 may also wirelessly transmit (e.g., via BLUETOOTH, WI-FI, and so on) the user feedback information to a user device (e.g., a mobile telephone or display of the EV 210).

Figure 4:
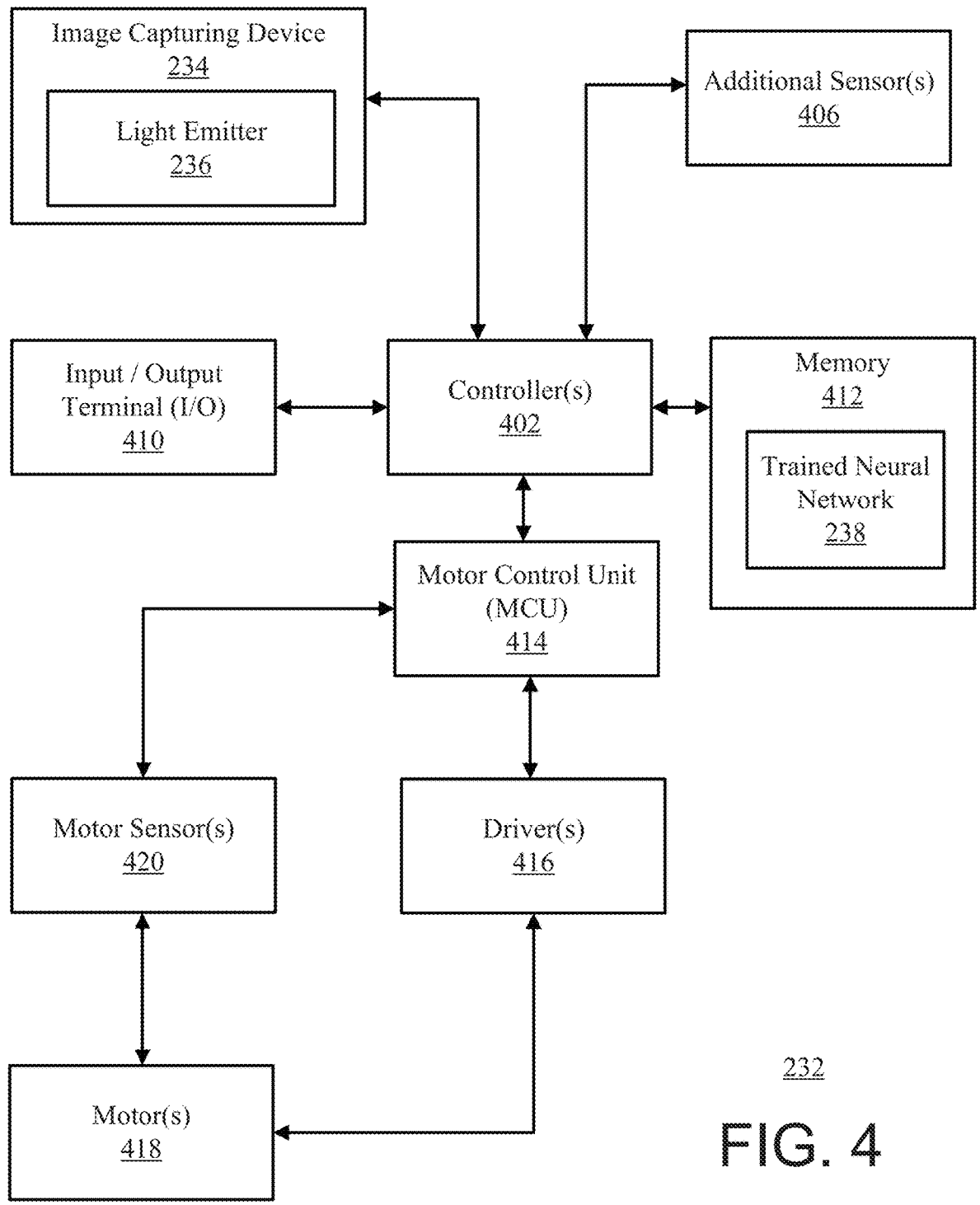
FIG. 4 is a schematic illustration of an exemplary control system according to one or more examples of the present disclosure.

FIG. 4 is a schematic illustration of an exemplary control system according to one or more embodiments of the present disclosure. It will be appreciated that the control system shown in FIG. 4 is merely an example and additional/alternative embodiments of the control system 232 are contemplated within the scope of the present disclosure.

The control system 232 includes a controller 402. The controller 402 is not constrained to any particular hardware, and the controller's configuration may be implemented by any kind of programming (e.g., embedded Linux) or hardware design—or a combination of both. For instance, the controller 402 may be formed by a single processor, such as general purpose processor with the corresponding software implementing the described control operations. On the other hand, the controller 402 may be implemented by a specialized hardware, such as an ASIC (Application-Specific Integrated Circuit), an FPGA (Field-Programmable Gate Array), a DSP (Digital Signal Processor), a GPU (graphics processing unit), an NVIDIA Jetson Device, a hardware accelerator, a processor operating TENSORFLOW, TENSORFLOW LITE, PYTORCH, and/or other ML software, and/or other devices. In some instances, the control system 232 and/or the controller 402 may be an edge computing hardware that is on and/or included within the robotic charging device 224.

The controller 402 is in electrical communication with memory 412. The memory 412 may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM), a ROM, an erasable programmable read-only memory (EPROM or Flash memory), a compact disc read-only memory (CD_ROM), or other tangible optical or magnetic storage device. The memory 412 may store corresponding software such as computer-readable instructions (code, script, etc.). The computer instructions being such that, when executed by the controller 402, cause the controller 402 to control the control system 232 to provide for the operation of the EV charging system 102 as described herein.

The memory 412 further includes the trained neural network 238. For instance, the control system 232 may receive a trained neural network 238 from the enterprise computing system 104 via the network 106 and store the trained neural network 238 in the memory 412. Then, the controller 402 may retrieve the trained neural network 238 and use it to determine regions of interest in one or more images captured by the image capturing device 234.

The controller 402 is configured to provide and/or obtain information such as the one or more images from the image capturing device 234. For instance, the image capturing device 234 may capture one or more images, or a continuous succession of images, that include the EV charging portal 212 and may provide the images to the controller 402. The controller 402 may use these images (alone or in combination with other elements of the control system 232) to determine the physical location, orientation, and/or status of the charging plug 230, the robotic arm 228, the EV 210, and/or the EV charging portal 212. For example, the controller 402 may use these images to determine the physical location of the EV charging portal 212 and provide instructions or commands to maneuver the robotic arm 228 such that it is insertable into the EV charging portal 212. The image capturing device 234 may be physically located at the charging device 224 or elsewhere in the charging system 102.

In some examples, the image capturing device 234 is a 2-dimensional (2-D) camera or other types of 2-D image capturing devices, for example, a charge-coupled device (CCD), or another type of electronic image acquisition device. In some instances, the image capturing device 234 includes the light emitter 236. For instance, the light emitter 236 may emit light such as a flash or another form of illumination, in a visible or invisible range. In some instances, the light emitted belongs in the infrared (IR) spectrum and/or ultraviolent (UV) spectrum but other types of radiation can be used. The image capturing device 234 may capture the images of the EV charging portal 212 using the light/illumination that results from retro-reflection or reflection of the radiation emitted by the emitter 236.

Additional sensors 406 may optionally be included within the control system 232. These additional sensors 406 may provide information to the control system 232 in conjunction with (or as a back-up to) information (e.g., images) provided by the image capturing device 234. For example, these additional sensors 406 may include a light sensor and/or flash camera sensor system. In other words, instead of the light emitter being part of the image capturing device 234, the EV charging system 102 may include an additional sensor that provides light/illumination for images captured using the image capturing device 234.

Additionally, and/or alternatively, the additional sensors 406 may optionally include another image capturing device (2D or 3D), a LiDAR sensor, a radio-frequency identification (RFID) sensor, an ultrasonic sensor, a capacitive sensor, an inductive sensor, a magnetic sensor, and/or the like, to refine the trajectory of the robot end-effector as it guides a plug to mate with the vehicle charging port after a visual identification of the location of the vehicle charging port has been made using visual or video information as described herein. In general, any sensor that can provide a signal that enables or enhances the control system's 232 ability to maneuver the charging plug 230 for easy and safe insertion into the charging portal 212 of the EV 210 may be included in the control system 232.

In some variations, the image capturing device 234 and additional sensors 406 form a flash-based photography sensing system. The flash-based photography system includes at least an image capturing device (e.g., device 234) and a light emitter (e.g., used for emitting a flash such as light emitter 236). In operation, the light emitter 236 cycles the flash, or provides a constant light by keeping the light emitter continuously illuminated and the resulting image is captured by the image capturing device 234.

In some instances, the control system 232 uses a light filter such as a band-pass filter to capture images of the EV charging portal 212. For instance, the light emitter 236 may emit light at a particular light spectrum. The image capturing device 234 and/or the controller 402 may include a band-pass filter that filters out light that is not at the illumination light spectrum. As such, the band-pass filter may be used to filter out other light sources/light such as regular sun-light, garage lights, and/or any other particular inconsistent light sources that flows throughout the day and environment. In other words, the light emitter 236 may emit light onto the EV charging portal 212 at a particular spectrum such as around 850 nanometers (nm) and the image capturing device 234 may capture an image. The band-pass filter may be used to filter out light other than light that is around 850 nm to enable the EV charging portal 212 to be more visible within the image. In other instances, the control system 232 uses another type of light filter such as a temporal filter to capture images of the EV charging portal 212. For instance, the light emitter 236 may emit light at specified frequencies that are synced with the frame rate of the image capturing device. The control system 232 may use the changes in the pixel characteristics of the pixels when the light is emitted as compared to when the light is not emitted to enable the EV charging portal 212 to be more visible within the images. The result may be used for determining the location of the EV charging portal 212.

The control system 232 is configured to drive motors 418 of the charging device 224. As used herein, motors 418 include AC motors, DC motors, gear-driven motors, linear motors, actuators, or any other electrically controllable device used to effect the kinematics of the charging device. Accordingly, the control system 232 is configured to automatically and continually determine the physical state of the charging system 102 and automatically control the various motors 418 of the charging device 224 to maneuver the robotic arm 228 including the charging plug 230 to be insertable into the charging portal 212 and retract the charging plug 230 after stopping or ceasing the charging of the EV 210.

The control system 232 may further include a motor control unit (MCU) 414 (also referred to herein as a motor controller), e.g., as part of the controller 402 or a separate device. The MCU 414 controls motor drivers 416 using feedback from motor sensors 420 (e.g., encoders) in order to provide real time control of the motors 418. Accordingly, the MCU 414 receives instructions for controlling the motors 418 (e.g., receives motor/actuator control signals from the controller 402), and interprets those instructions, in conjunction with feedback signals from the motor sensors 420, to provide control signals to the motor drivers 416 for accurate and real-time control of the motors 418 (e.g., sends motor/actuator driver signals). The motor drivers 416 transform the control signals, as communicated by the MCU 414, into drive signals for driving the motors 418 (e.g., sends individual operation signals to the motors/actuators). In another embodiment, the MCU 414 is integrated with circuitry to directly control the motors 418.

The MCU 414 may be included as part of the controller 402 or a stand-alone processing system (e.g., a microprocessor). Accordingly, just like the controller 402, the MCU 414 is not constrained to any particular hardware, and the MCU's configuration may be implemented by any kind of programming or hardware design—or a combination of both.

The control system 232 may include an input/output (I/O) terminal 410 for sending and receiving various input and output signals. For example, the control system 232 may send/receive external communication or data (e.g., the trained NN 238) to a user, a server (e.g., a billing server and/or the enterprise computing system 104), a power unit, etc. via the I/O terminal 410. The control system 232 may further control the user feedback interface via the I/O terminal 410 (or otherwise).

Figure 5:
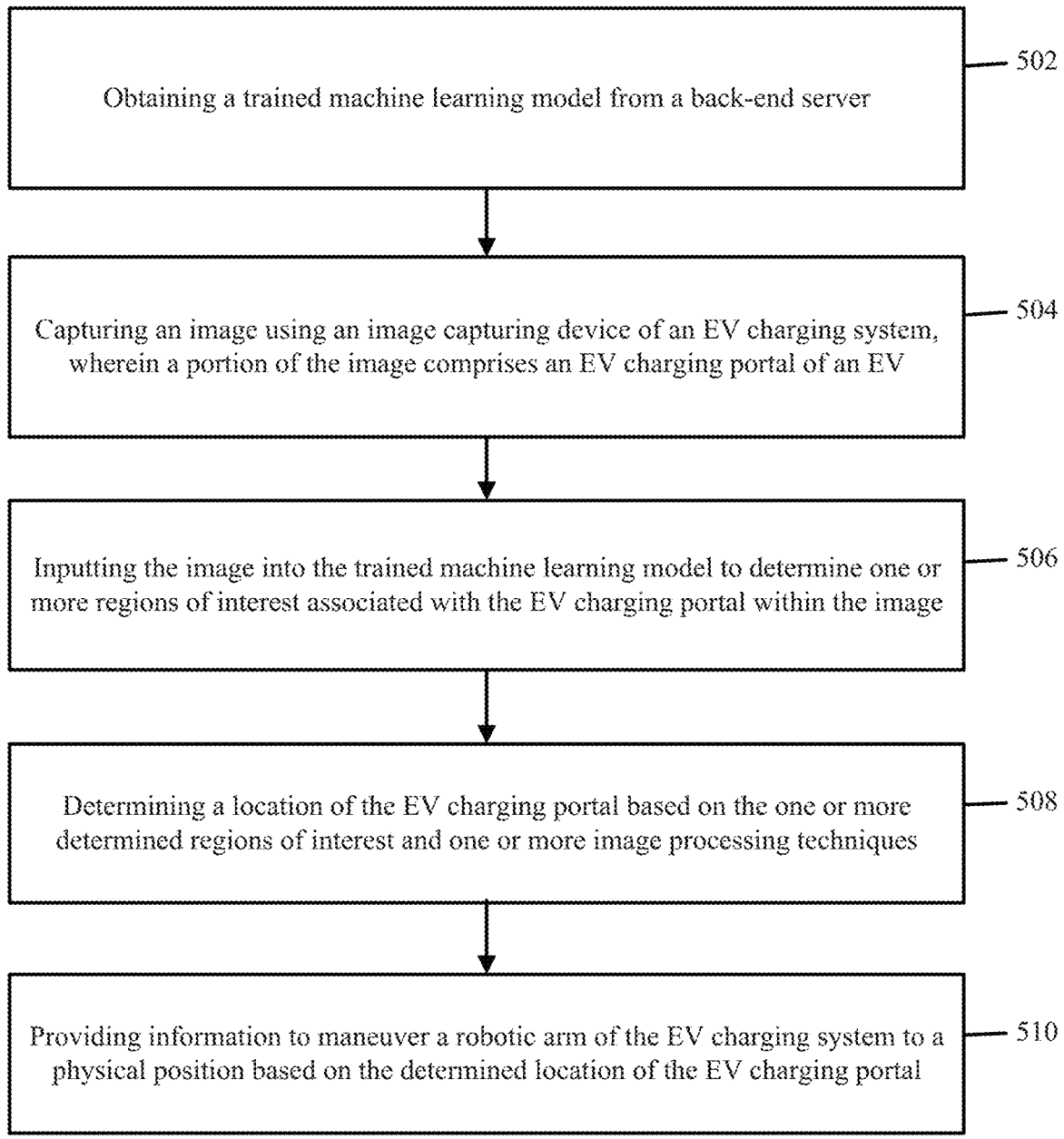
FIG. 5 illustrates a process for operating an EV charging system to charge an EV according to one or more examples of the present disclosure.

FIG. 5 illustrates a process 500 for operating the EV charging system 102 to charge the EV 210 according to one or more embodiments of the present disclosure. The process 500 may be performed by the control system 232 and in particular, the controller 402 shown in FIG. 4. However, it will be recognized that any of the following blocks may be performed in any suitable order and that the process 500 may be performed in any suitable environment including EV charging environment 100, 200, 300 and/or additional/alternative environments and by any suitable controller or processor.

At block 502, the control system 232 obtains a trained machine learning model (e.g., a trained CNN) from a back-end server (e.g., the enterprise computing system 104). For example, as mentioned above, the enterprise computing system 104 may use images (e.g., actual images of EV charging portals and/or synthetic images such as CAD based images of EV charging portals) to train an ML model. As described below, the ML model used in process 500 is a trained CNN. However, it will be recognized that process 500 may use any type of object detection ML and/or AI model, model, and/or algorithm that is capable of localizing an object (e.g., the EV charging portal) within an image. The enterprise computing system 104 may continuously input the images into the CNN until the accuracy of the CNN reaches a certain threshold or marker. Afterwards, the enterprise computing system 104 may provide the trained CNN to the EV charging system 102 and the control system 232 of the EV charging system 102 may obtain the trained CNN.

In some instances, the enterprise computing system 104 may provide a trained CNN that is associated with a particular type of EV charging portal 212. For example, the enterprise computing system 104 may train the CNN using images of a particular type of standard EV charging portal such as the CCS 2 standard EV charging portal. The EV charging system 102 may provide information indicating one or more types of EV charging portals that they service (e.g., the charging plug 230 at the EV charging system 102 is associated with a CCS 2 standard EV charging portal). The enterprise computing system 104 may provide the CNN that has been trained using images of CCS 2 EV charging portals to the EV charging system 102.

In some examples, the enterprise computing system 104 may train the CNN such that the output of the CNN indicates one or more regions of interest within a captured image. The one or more regions of interest may include a bounding box (e.g., a dimension dependent parameter such as an area of the bounding box) and/or a pixel or pixel region value dependent parameter (e.g., an RGB or luminance value of the pixel is within a certain range). In other words and in some instances, the CNN may be used to filter out pixels within a captured image such that an image processing technique (e.g., SIFT) may be able to determine the location of the EV charging portal 212 without analyzing the entire image, which may save computational power.

At block 504, the control system 232 captures an image using an image capturing device (e.g., image capturing device 234) of an EV charging system (e.g., EV charging system 102). The captured image includes a multitude of pixels and a portion of the captured image includes the EV charging portal 212.

For example, an operator of the EV 210 may seek to charge their EV using the EV charging system 102. The EV charging system 102 may capture one or more images of the EV 210 (e.g., the EV charging portal 212) and use the images to maneuver the robotic arm 228 to the EV charging portal 212.

In some examples, the control system 232 uses a light emitter (e.g., light emitter 236) to capture the image. For example, the light emitter 236 may emit light or illumination (e.g., a flash) that is used by the image capturing device 234 to capture the image. As described above, the image capturing device 234 may include the light emitter and/or the additional sensors 406 may include the light emitter. The control system 232 may provide instructions to the light emitter 236 to provide the light/illumination for capturing the image. In some variations, the light or illumination emitted by the light emitter may be in a non-visible light spectrum (e.g., an infrared (IR) light and/or ultraviolet (UV) light). For example, the light emitter may be non-visible light emitter that is configured to emit non-visible illumination (e.g., illumination that has a light frequency in a range that is not visible by humans such as IR light or UV light).

In some variations, the control system 232 and/or the image capturing device 234 may use a light filter (e.g., a band-pass filter and/or a temporal filter) to filter out pixels/portions of the captured image based on the illumination from the light emitter 236. For example, the light emitter 236 may emit light at a certain spectrum and the filter may filter out light other than the light at that spectrum so as to remove other light sources. To put it another way, a captured image may include light from the light emitter 236 and/or other light sources such as the sun or a garage light. The control system 232 may filter out the light from the other light sources. For instance, the light filter may be a band-pass filter such as a film on a small piece of glass on the back-side of the lens (e.g., the lens of the image capturing device 234) that only permits specific wavelengths of light to proceed through the filter. The specific wavelengths of light may match the light from the light emitter 236.

In some instances, the control system 232 captures more than one image. For instance, the control system 232 may use the image capturing device 234 to capture multiple images. Additionally, and/or alternatively, the control system 232 may use another image capturing device to capture one or more additional images. The control system 232 may use the multiple images to identify the physical position of the EV charging portal 212 and maneuver the robotic arm 228 and/or charging plug 230 accordingly.

At block 506, the control system 232 inputs the image into the trained machine learning model (e.g., the CNN) to determine one or more regions of interest associated with the EV charging portal (e.g., the charging portal 212) within the image. For instance, after capturing the image, the control system 232 may input the image into the CNN to generate an output. The output may indicate regions of interest within the captured image for the control system 232 to perform further image processing to determine the location of the charging portal 212. For example, the EV charging portal 212 might not be a singular slot and therefore, the control system 232 may validate that the charging plug 230 can interface with the charging portal 212.

FIG. 6 depicts an exemplary configuration of the EV charging portal 212 with one or more regions of interest according to one or more examples the present disclosure. For example, the EV charging portal 212 includes certain geometric shapes such as two large circles at the top and seven smaller circles at the bottom. A particular standard, such as CCS 1 or CCS 2, may be defined by these geometric shapes. For instance, FIG. 6 shows a CCS 2 EV charging portal. Further, FIG. 6 also shows two regions of interest 602 that may be determined and output by the CNN based upon the geometric shapes of the CCS 2 EV charging portal. The regions of interest 602 may be defined by bounding boxes such as an area or the dimension(s). For example, based on inputting the image into the CNN, the control system 232 may determine two areas defined by the regions of interest 602 within the image. Then, as will be described below, the control system 232 may use one or more image processing techniques to determine the six DoF (e.g., forward/backward, up/down, left/right, yaw, pitch, and/or roll) of the EV charging portal 212 and use the six DoF to maneuver the charging plug 230 to the EV charging portal 212 to initiate charging of the EV 210. The EV charging portal 212 shown on FIG. 6 is merely an example and in other instances, the EV charging portal 212 may be another type of EV charging portal that enables the EV charging system 102 to charge the EV 210.

Figure 7:
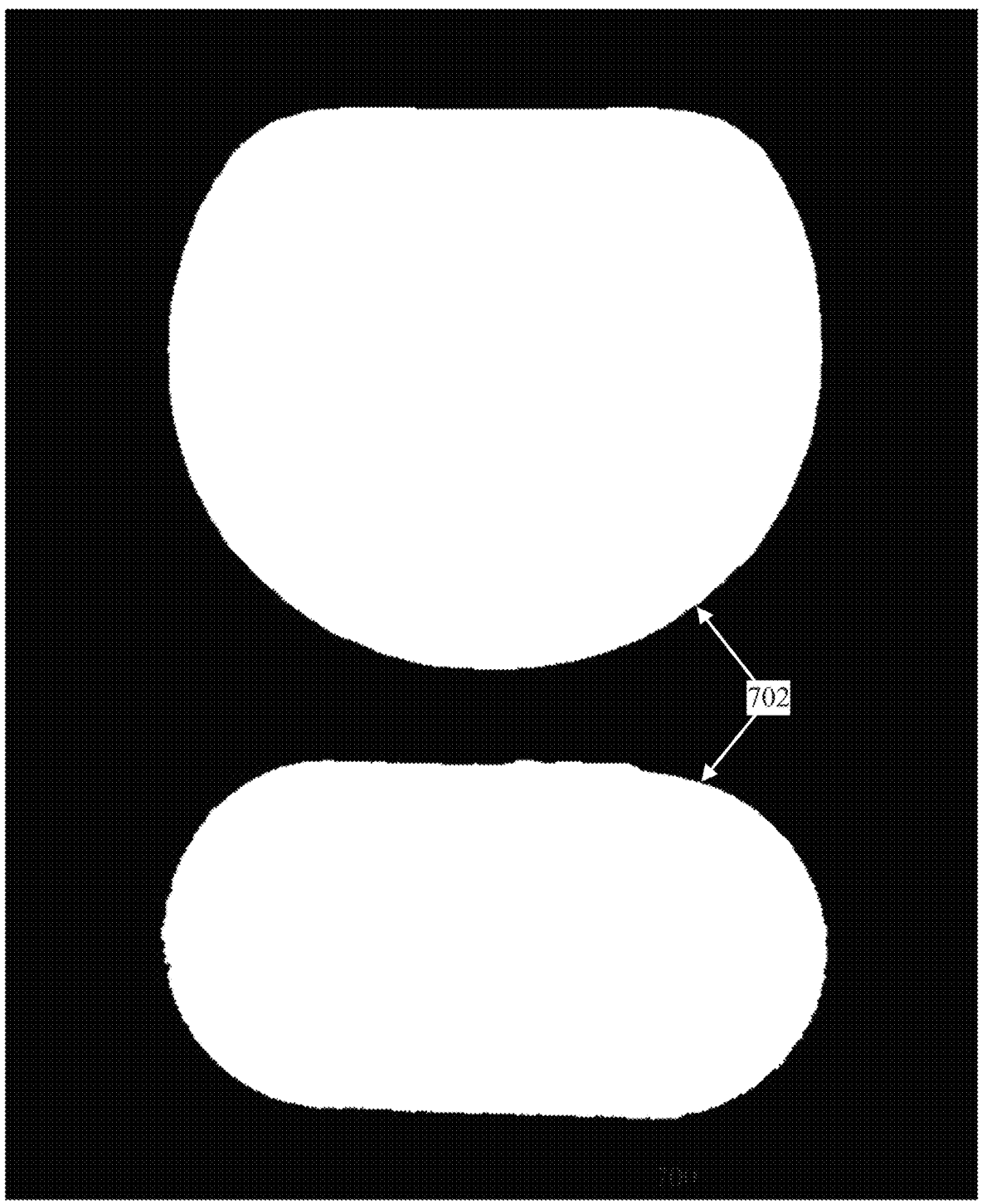
FIGS. 7-9 depict images captured by an image capturing device and then processed by the control system according to one or more examples of the present disclosure.

FIG. 7 depicts an exemplary processed image 700 with the determined regions of interest 702. For instance, based on inputting the captured image into the trained CNN, the control system 232 may determine the regions of interest 702. The regions of interest 702 may differ from regions of interest 602 as they are not rectangles, but rather ovals and/or other shapes. In other words, the output of the CNN may be any type of shape and/or structure that defines a region of interest within the captured image. Furthermore, image 700 shows just the output of the CNN whereas image 600 shows the output of the CNN (e.g., the regions of interest 602) as well as the actual geometry of the EV charging portal 212.

Referring back to block 506, the control system 232 may determine the one or more regions of interest based on one or more dimension dependent parameters. The dimension dependent parameters may indicate an area of the bounding box, the dimension(s) of the bounding box (e.g., the height or width of the box), the corners/points of the bounding box (e.g., the four points defining the corners of the bounding box, and/or additional/alternative neural network dimensional outputs (e.g. 2D bounding box, 3D bounding box, semantic/instance segmentation mask, or point cloud). For instance, the dimension dependent parameters may scale the value of the contour sizes that are filtered out from the image (e.g., the portions of the image other than the area within the bounding boxes 602), which allows contour filtering to maintain the contours of interest, invariant of scale/rotations.

Additionally, and/or alternatively, the control system 232 may determine the one or more regions of interest based on a pixel/pixel region value dependent parameter. For instance, a multi-model distribution of pixel values within the bounding box may be used to maximize contrast by applying a threshold/filter between modes, which may make the process invariant to noise/contamination or otherwise irrelevant pixel information outside of the bounding box regions of interest. In other words, the image may be made up of a plurality of pixels with each pixel having particular pixel characteristics such as RGB values, luminance (intensity) values, and/or other pixel characteristics. Based on inputting the image into the CNN, the control system 232 may determine pixel/pixel region value dependent parameters such as one or more thresholds associated with the pixel characteristics. For instance, the threshold may indicate one or more luminance value thresholds that may be used to perform segmentation on the image. The control system 232 may use the output of the CNN (e.g., the luminance value thresholds) and filter out pixels based on this output. Based on the filtering, the resulting pixels may include the pixels shown within the regions of interest 602.

At block 508, the control system 232 determines a location of the EV charging portal based on the one or more determined regions of interest and one or more image processing techniques. For example, the control system 232 may determine the location and orientation of the EV charging portal based on the six degrees of freedom (DoF) associated with the EV charging portal. As mentioned above, the six DoF indicates forward/backward, up/down, left/right, yaw, pitch, and/or roll. For example, three of the six DoF may be and/or indicate the x, y, and z positions of the EV charging portal. The other three of the six DoF may be the pitch, roll, and yaw that indicate the orientation of the EV charging portal. For instance, in some examples, EV manufacturers may orient the charging portal differently. For example, referring to FIG. 6, a first EV may have a charging portal with the orientation shown in FIG. 6. Another EV may have the same layout as the charging portal shown in FIG. 6, but oriented differently such as having the entire EV charging portal being rotated 90 degrees. As such, the first three DoF (e.g., the x, y, and z positions) may indicate a location of the EV charging portal and the other three DoF (e.g., the pitch, roll, and yaw) may indicate an orientation of the EV charging portal. Using the determined regions of interest (e.g., the bounding boxes and/or the pixel value dependent parameters) from the output of the CNN, the control system 232 may determine the six DoF associated with the EV charging portal 212.

For instance, in some examples, the control system 232 may fit the regions of interest to an expected geometry so that the process may become more invariant to edge noise/shadows. For example, as mentioned above, the control system 232 may use a particular type of charging plug 230 to charge a particular type of EV charging portal 212. In some instances, this particular type may be a CCS 2 charging portal 212. The control system 232 may receive and/or determine information indicating particular geometries of the type of charging portal 212/charging plug 230. For instance, as shown in FIG. 6, the CCS 2 charging portal 212 may include two large circles in the top portion and 7 smaller circles in the bottom portion. Based on these known geometries, the control system 232 may fit the regions of interest to the known geometries. To put it another way, referring to the regions of interest 602 on FIG. 6, the control system 232 may determine the first region of interest 602 (e.g., the upper bounding box) has two large circles and may "fit" or generate a new image with two large circles within the first region of interest 602. Further, within the same new generated image, the control system 232 may determine the second region of interest 602 (e.g., the lower bounding box) has seven small circles and may fit or place seven smaller circles within the second region of interest 602. In addition, the control system 232 may place these circles within a particular location of the new image based on the expected geometry. For example, the control system 232 may receive information indicating that the two large circles are a certain distance away from each other. As such, the control system 232 may place the place the two large circles such that they are the same distance away from each other in the newly generated image.

Referring to FIG. 7, in some variations, the control system 232 may use the pixel/pixel region value dependent parameters to determine these regions of interest 702. Then, based on the known geometries, the control system 232 may fit the regions of interest 702 with the known geometries for the charging plug 230 and/or the charging portal 212.

In some instances and referring to FIG. 6, the circles may be of a different color than the overall EV charging portal 212. For example, the circles may represent holes that are capable of receiving the charging plug 230. The rest of the EV charging portal 212 may be of a different color than the holes. For instance, the overall EV charging portal 212 may be painted white or a different lighter color whereas the holes may be darker in color (since it is a hole), which is shown in FIG. 6. As such, the pixel characteristics of the circle may be different from the overall EV charging portal. The control system 232 may use one or more thresholds (e.g., a luminance and/or an RGB threshold) to determine the location of these circles within the regions of interest 602. As mentioned previously, the charging portal 212 is merely exemplary and in other instances, the charging portal 212 may use ellipses and/or other shapes rather than circles.

Additionally, and/or alternatively, after identifying the circles within the charging portal 212, the control system 232 may use the known fitted geometries for the circles. For instance, the captured image may have noise and/or shadows on the edges of these circles, which might impact the overall shape of them (e.g., they are not completely circular). As such, the control system 232 may use the known geometries (e.g., that these are actually circles) to smooth out the boundaries.

Figure 8:
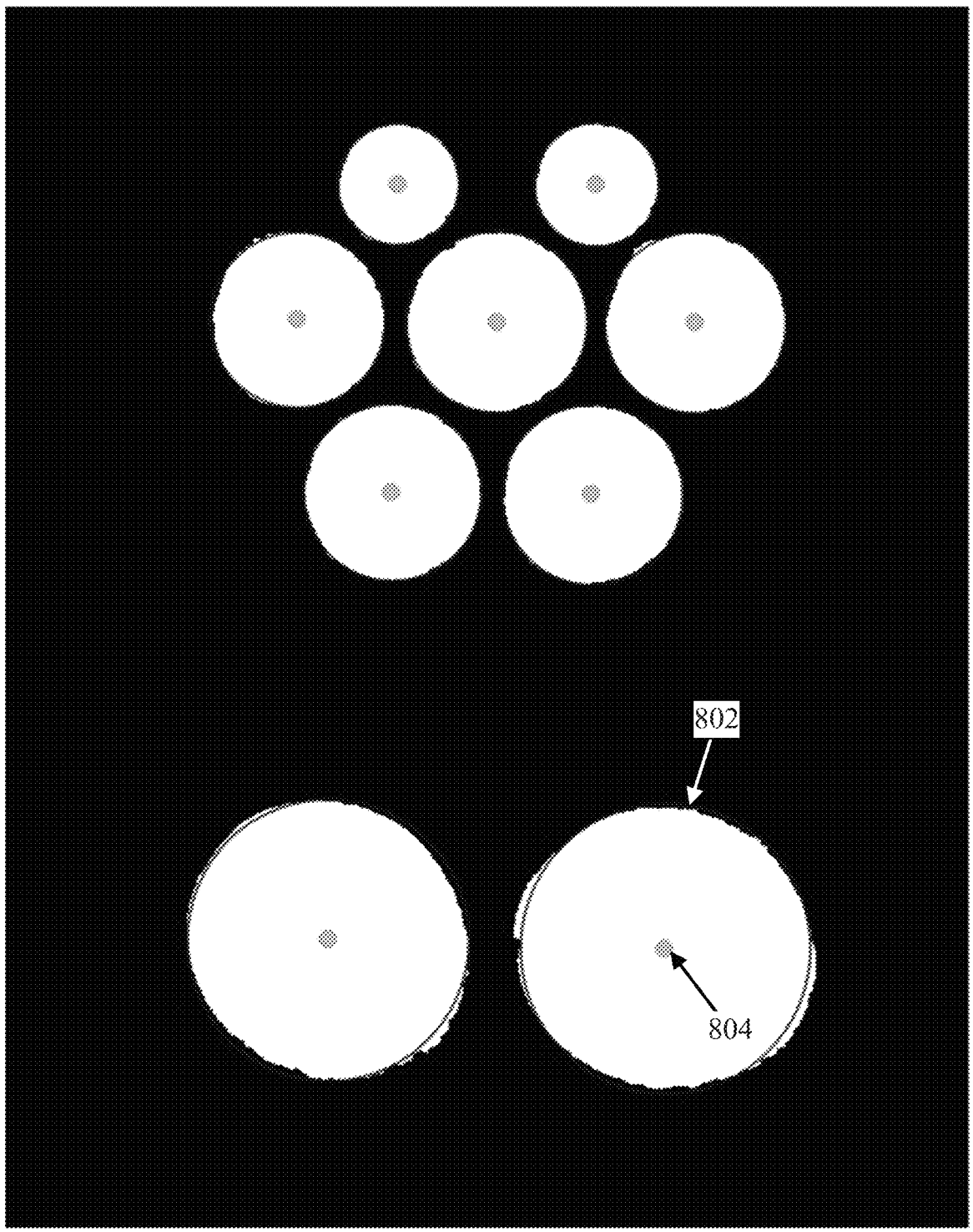

After fitting the regions of interest to the expected geometry, the control system 232 determines reliable keypoints or points of interest within the image. For instance, the points of interest may be a center-point and/or another point (e.g., a corner or an edge) within the image. For example, referring to FIG. 6, the points of interest may be the center-point of the circles within the regions of interest 602. FIG. 8 depicts an exemplary processed captured image 800 according to one or more examples the present disclosure. In particular, the processed captured image 800 shows multiple different circles that represent the holes of the charging portal 212. One of these circles is denoted by reference number 802. Further, the processed captured image 800 shows multiple different keypoints that are the center-points of the circles. One of these keypoints is denoted by reference number 804.

Figure 9:
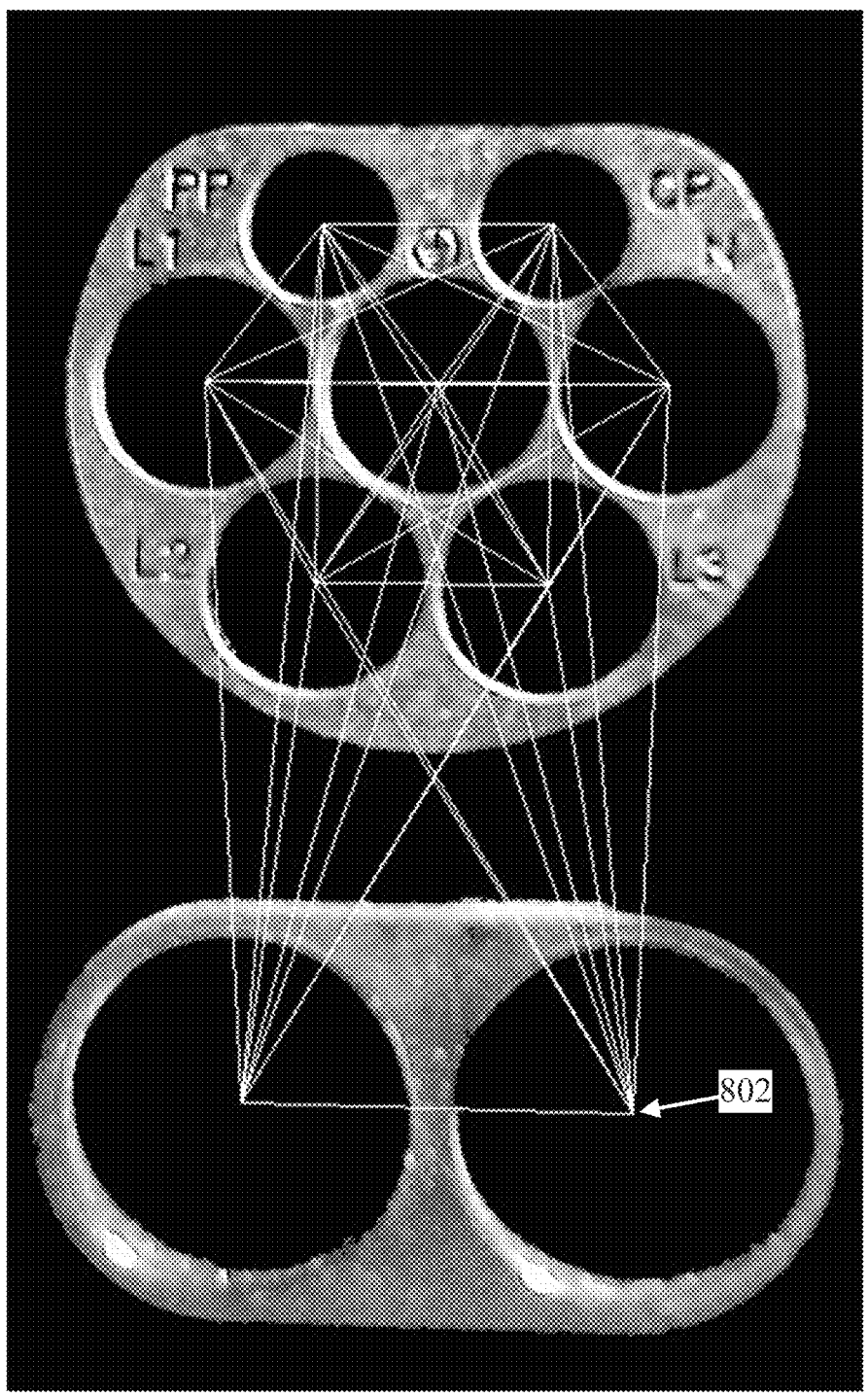

Using these reliable keypoints, the control system 232 determines a skeleton of the charging portal 212 within the captured image. For instance, the control system 232 may draw lines between each of the identified keypoints (e.g., from the keypoint 804 to each of the other keypoints within the image 800). FIG. 9 depicts an exemplary processed captured image 900 that shows the skeleton of the charging portal 212 after drawing lines between each of the identified keypoints. The image 900 further shows the keypoint 802 from FIG. 8.

Subsequently, the control system 232 mathematically "describes" the keypoints and/or the skeleton based on the neighboring pixels using an image processing algorithm, a feature detection algorithm, feature matching algorithm, feature description algorithm, and/or other image/feature algorithms. In other words, the control system 232 may determine the six DoF based on the determined keypoints and/or the virtual skeleton. For instance, in a simplified example, the control system 232 may provide descriptors or identifiers for the keypoints. In some instances, the control system 232 may generate one or more matrices, or other data structures, that describe the descriptors associated with the pixels within the image.

The control system 232 may describe the keypoints and/or virtual skeleton of the charging portal 212 using any many different algorithms, methods, and/or image processing techniques. These include, but are not limited to, SIFT techniques, floating point techniques, binary techniques, oriented FAST and rotated BRIEF (ORB) techniques, 64-bit floating point techniques, 128-bit floating point techniques, and/or additional techniques.

Afterwards, the control system 232 matches the described features of the template using a feature matching algorithm and/or based on a match quality score. For example, after mathematically describing the keypoints and/or the skeleton, the control system 232 may match them with a template using a feature matching algorithm, a match quality score, and/or one or more statistical values (e.g., a sum of the squared differences and/or a ratio of the sum of the square differences).

Based on the matched keypoints from the template, the control system 232 then solves the perspective problem to transform the observed keypoints to the template keypoints, which results in an invariant six DoF pose estimation. For instance, the control system 232 may use one or more equations to determine the six DoF transformation such that the patterns may be super imposed on the template. In other words, the control system 232 may determine instructions or commands for the robotic arm 228 using the one or more equations to transform the observed keypoints to the template keypoints. The instructions may indicate for the robotic arm 228 to move in certain x, y, and z directions (e.g., 200 millimeters (mm) in the x direction, 10 mm in the y direction, and 50 mm in the z direction) and/or rotate the robotic arm 228 based on the pitch, roll, and yaw values associated with the EV charging portal 212.

At block 510, the control system 232 provides information (e.g., one or more signals, instructions, and/or commands) to maneuver the robotic arm 228 of the EV charging system 102 to a physical position based on the determined location of the EV charging portal. For example, based on block 508, the control system 232 may maneuver (e.g., move/orient) the robotic arm 228 and/or the charging plug 230 to a physical position such as by sending control signals to maneuver the robotic arm 228/charging plug 230 such that it is insertable into the charging portal 212. In other words, the control signals include instructions used to operate the motors 418 to correctly move and position the charging plug 230 to charge the EV 210. The control signals may further include instructions to insert the charging plug 230 into the charging portal 212 and/or retract the robotic arm 228/the charging plug 230 after charging the EV 210.

More particularly, the control system 232 determines motor control signals, which are configured to (when executed) controllably operate motors 418 to position and orient the arm 228 within the working volume to a position where the charging portal 212 is reachable by the charging plug 230. The control system 232 then sends those motor control signals to execute the specified movements. The motors 418 may include a plurality of motors collectively configured to (ultimately) position the distal end of the charging plug 230 to be in reach of the charging plug 230.

The control system 232 may also determine actuator control signals, which are configured to adjust the orientation and/or the position of the charging plug 230 to align the charging plug 230 with the charging portal 212. The control system 232 then sends those actuator control signals to execute the specified movements. The motors 418 include actuators specifically for fine-tuning the orientation/position of the charging plug 230, and the actuator control signals are directed at controlling such actuators.

The control system 232 further determines further motor control signals, which are configured to operate the motors 418 to insert the charging plug 230 into the charging portal 212. The control system 232 then sends those further motor control signals to execute the specified movements. Subsequently, e.g., after charging is completed, the control system 232 determines and sends additional motor control signals, which when executed, cause the motors 418 to retract the robotic arm 228 to its fully retracted state.

The MCU 414 receives the motor/actuator control signals, and may further receive feedback signals. The feedback signals are provided by motor sensors 420 detecting the state/position of the various motors/actuators of the charging device 224. Based on the feedback signals and the motor/actuator signals, the MCU 414 determines motor driver signals and actuator driver signals. As such, the control signals may be high-level instructions for the operation (or resulting position) of the elements of the charging device 224, and the MCU 414 may interpret those high-level instructions (as informed by the feedback signals) to provide lower-level control signals for individually driving the motors/actuators. The MCU 414 sends the motor driver signals and actuator driver signals directly to at least one motor driver 416. In some examples, the MCU 414 includes circuitry capable of operating the appropriate voltage and currents for driving actuators coupled to its processing system (e.g., a microcontroller, FPGA, ASIC, etc.), and therefore, may send the motor driver signals and actuator driver directly to the motors 418.

In some variations and referring to block 504, the control system 232 captures multiple images from a single image capturing device (e.g., device 234) and/or from multiple different image capturing devices. The control system 232 may use the multiple images to maneuver the robotic arm 228 and charge the EV 210.

In some instances, the control system 232 may provide feedback to the enterprise computing system 104 to further train and/or update the ML model such as a CNN. For example, the ML/AI training system 108 may continuously update and train the ML model. Initially, the training may be performed by actual images and/or synthetic data. After providing the ML model to one or more EV charging systems 102. The EV charging systems 102 may charge EVs (e.g., EV 210) using the trained ML models and capturing images of the EV charging portals (e.g., charging portal 212). The EV charging systems 102 may provide the captured images and/or additional feedback information back to the enterprise computing system 104 so as to continue training the ML model. For example, the additional feedback information may indicate an error or misalignment between the charging plug 230 and the EV charging portal 212. Additionally, and/or alternatively, the additional feedback may indicate that the regions of interest are too large or too small to account for the geometries of the charging plug. For instance, due to environmental conditions such as excessive or lack of light, the ML model may output regions of interest that are too large, which may require significantly more computing resources than expected. Accordingly, the EV charging systems 102 may provide the captured image as well as feedback information indicating this back to the enterprise computing system 104. Using this information, the enterprise computing system 104 may further train the ML model and provide an updated ML model based on the updated dataset to the EV charging systems 102 to use for charging the EVs.

Referring back to block 506, the control system 232 inputs the image into the trained machine learning model (e.g., the CNN) to generate one or more dimension dependent parameters such as one or more segmentation masks, one or more point clouds, and/or one or more disparity maps. For example, in some instances, the control system 232 may use the trained CNN to generate one or more segmentation masks for use in determining the location of the EV charging portal 212. The one or more segmentation masks may function similarly to a bounding box localization, where the area (or other dimension dependent parameter) of the mask may be used to scale the filtering of geometry or concentrate the pixel value filtering so as to determine the location and/or orientation of the EV charging portal 212.

Additionally, and/or alternatively, the control system 232 may use the CNN to generate one or more point clouds or disparity maps. A point cloud is a set of data points within a space and a disparity map refers to an apparent pixel difference or motion between a pair of stereo images (e.g., the disparity map may be a precursor to point clouds for stereo depth vision). The control system 232 may use the point clouds and/or disparity maps to determine the location and/or orientation of the EV charging portal 212. For instance, the distance between known points of interest of the point cloud or disparity map of the charging portal 212 may be used to filter out pixels not of interest (e.g., based on the distance of the receptacle of interest from the image capturing device 234, and the derived size of the expected features at that distance). The control system 232 may then use this information to scale the filtering of the geometry or concentrate the pixel value filtering so as to determine the location and/or orientation of the EV charging portal 212. By using this methodology, computational resources may be saved as a less accurate point cloud may be leveraged to determine an accurate pose estimation.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for a charging system to autonomously charge an electric vehicle (EV), comprising:
   obtaining, by a control system, a trained machine learning (ML) model from a back-end server;
   capturing, by the control system, an image using an image capturing device of the charging system, wherein a portion of the image comprises an EV charging portal of the EV;
   inputting, by the control system, the image into the trained ML model to determine one or more regions of interest associated with the EV charging portal within the image;

determining, by the control system, a location of the EV charging portal based on the one or more determined regions of interest and one or more image processing techniques; and providing, by the control system, information to maneuver a robotic arm of the charging system to a physical position based on the determined location of the EV charging portal.

2. The method of claim 1, wherein inputting the image into the trained ML model to determine the one or more regions of interest comprises inputting the image into the trained ML model to generate one or more dimension dependent parameters associated with one or more bounding boxes within the image, and wherein determining the location of the EV charging portal is based on:
filtering out pixels within the image that are outside of the one or more bounding boxes; and
applying the one or more image processing techniques to remaining pixels within the one or more bounding boxes.

3. The method of claim 2, wherein the one or more dimension dependent parameters indicate an area of a first bounding box of the one or more bounding boxes, one or more dimensions of the first bounding box, or one or more corner points of the first bounding box.

4. The method of claim 1, wherein inputting the image into the trained ML model to determine the one or more regions of interest comprises inputting the image into the trained ML model to generate a pixel value dependent parameter associated with a pixel characteristic, and wherein determining the location of the EV charging portal is based on:
filtering out pixels within the image based on the pixel value dependent parameter; and
applying the one or more image processing techniques to the image based on filtering out the pixels.

5. The method of claim 4, wherein the pixel characteristic is a value associated with a pixel within the image, and wherein the pixel value dependent parameter is a datatype threshold that is used to filter out the pixels within the image.

6. The method of claim 1, wherein the robotic arm is controllably extendable and retractable, wherein the robotic arm is adapted to carry a charging plug located at a distal end of the robotic arm, wherein the charging plug is configured to be controllably moveable and insertable into the EV charging portal.

7. The method of claim 1, wherein capturing the image using the image capturing device comprises:
providing instructions for a light emitter to emit illumination at a light spectrum;
capturing the image using the illumination at the light spectrum; and
using a band-pass filter to filter out portions of the image based on the illumination at the light spectrum,
wherein inputting the image into the trained ML model comprises inputting the image that has been filtered using the band-pass filter into the trained ML model.

8. The method of claim 1, wherein the trained ML model is a convolutional neural network (CNN), and wherein the back-end server trains the CNN using actual images of one or more first EV charging portals and/or synthetic data of one or more second EV charging portals.

9. The method of claim 1, wherein determining the location of the EV charging portal comprises:

determining a plurality of keypoints within the determined regions of interest based on a known geometry associated with the EV charging portal;
generating a virtual skeleton image of the EV charging portal based on the plurality of keypoints; and
determining the location of the EV charging portal based on applying the one or more image processing techniques to the plurality of keypoints and the virtual skeleton image.

10. The method of claim 9, wherein the one or more image processing techniques comprises a scale-invariant feature transform (SIFT) technique or an oriented FAST and rotated BRIEF (ORB) technique.

11. The method of claim 1, wherein determining the location of the EV charging portal comprises:
determining a six degrees of freedom (DoF) associated with the EV charging portal based on the one or more determined regions of interest and one or more image processing techniques; and
determining the location of the EV charging portal based on the six DoF.

12. The method of claim 1, wherein inputting the image into the trained ML model to determine the one or more regions of interest comprises inputting the image into the trained ML model to generate one or more dimension dependent parameters associated with one or more segmentation masks within the image, and wherein determining the location of the EV charging portal is based on:
filtering out pixels within the image that are outside of the one or more segmentation masks; and
applying the one or more image processing techniques to remaining pixels within the one or more segmentation masks.

13. The method of claim 12, wherein the one or more dimension dependent parameters indicate an area of a first segmentation mask of the one or more segmentation masks, one or more dimensions of the first segmentation mask, or one or more corner points of the first segmentation mask.

14. The method of claim 1, wherein inputting the image into the trained ML model to determine the one or more regions of interest comprises inputting the image into the trained ML model to generate one or more dimension dependent parameters associated with one or more point clouds within the image, and wherein determining the location of the EV charging portal is based on:
filtering out pixels within the image that are outside of the one or more point clouds; and
applying the one or more image processing techniques to remaining pixels within the one or more point clouds.

15. The method of claim 14, wherein the one or more dimension dependent parameters indicate an area of a first point cloud of the one or more point clouds, one or more dimensions of the first point cloud, or one or more corner points of the first point cloud.

16. A plug connection system for use in autonomously charging an electric vehicle (EV), the plug connection system comprising:
a robotic arm that is controllably extendable and retractable, wherein the robotic arm is adapted to carry a charging plug located at a distal end of the robotic arm, wherein the charging plug is configured to be controllably moveable and insertable into a EV charging portal of the EV;

an image capturing device configured to capture one or more images; and a control system configured to:
- obtain a trained machine learning (ML) model from a back-end server;
- capture an image using the image capturing device, wherein a portion of the image comprises the EV charging portal;
- input the image into the trained ML model to determine one or more regions of interest associated with the EV charging portal within the image;
- determine a location of the EV charging portal based on the one or more determined regions of interest and one or more image processing techniques; and
- provide information to maneuver the robotic arm to a physical position based on the determined location of the EV charging portal.

17. The plug connection system of claim 16, wherein inputting the image into the trained ML model to determine the one or more regions of interest comprises inputting the image into the trained ML model to generate one or more dimension dependent parameters associated with one or more bounding boxes within the image, and wherein determining the location of the EV charging portal is based on:
- filtering out pixels within the image that are outside of the one or more bounding boxes; and
- applying the one or more image processing techniques to remaining pixels within the one or more bounding boxes.

18. The plug connection system of claim 17, wherein the one or more dimension dependent parameters indicate an area of a first bounding box of the one or more bounding boxes, one or more dimensions of the first bounding box, or one or more corner points of the first bounding box.

19. The plug connection system of claim 16, wherein inputting the image into the trained ML model to determine the one or more regions of interest comprises inputting the image into the trained ML model to generate a pixel value dependent parameter associated with a pixel characteristic, and wherein determining the location of the EV charging portal is based on:
- filtering out pixels within the image based on the pixel value dependent parameter; and
- applying the one or more image processing techniques to the image based on filtering out the pixels.

20. A non-transitory computer-readable medium having processor-executable instructions stored thereon, wherein the processor-executable instructions, when executed by one or more controllers, facilitate:
- obtaining a trained machine learning (ML) model from a back-end server;
- capturing an image using an image capturing device of a charging system, wherein a portion of the image comprises the EV charging portal;
- inputting the image into the trained ML model to determine one or more regions of interest associated with the EV charging portal within the image;
- determining a location of the EV charging portal based on the one or more determined regions of interest and one or more image processing techniques; and
- providing information to maneuver a robotic arm of the charging system to a physical position based on the determined location of the EV charging portal.

* * * * *